US006437279B1

(12) United States Patent
Sawyer et al.

(10) Patent No.: US 6,437,279 B1
(45) Date of Patent: Aug. 20, 2002

(54) METHOD AND APPARATUS FOR LEVELING AND SHIELDING A STUD GUN AND OPERATOR

(75) Inventors: David R. Sawyer, Smithfield; Johnnie N. Burchett, Courtland; John B. Williams, III, Shacklesford, all of VA (US)

(73) Assignee: Newport News Shipbuilding and Dry Dock Company, Newport News, VA (US)

( * ) Notice: Subject to any disclaimer, the term of this patent is extended or adjusted under 35 U.S.C. 154(b) by 57 days.

(21) Appl. No.: 09/723,466

(22) Filed: Nov. 28, 2000

(51) Int. Cl.[7] ................................................. B23K 9/20
(52) U.S. Cl. .......................................... 219/99; 219/98
(58) Field of Search ...................... 219/98, 99

(56) References Cited

U.S. PATENT DOCUMENTS

| 4,424,434 A | * | 1/1984 | Pease et al. | 219/98 |
|---|---|---|---|---|
| 4,531,042 A | | 7/1985 | Shoup et al. | |
| 4,567,344 A | | 1/1986 | Michalski, Jr. | |
| 4,681,998 A | * | 7/1987 | Kon | 219/72 |
| 4,735,390 A | * | 4/1988 | Richards | 108/156 |
| 4,804,820 A | * | 2/1989 | Shoup | 219/98 |
| 5,115,114 A | * | 5/1992 | Paulonis et al. | 218/98 |
| 5,138,128 A | | 8/1992 | Van Rhyn et al. | |
| 5,452,839 A | | 9/1995 | Kapusnik et al. | |
| 6,163,005 A | * | 12/2000 | Easterday | 219/98 |

* cited by examiner

Primary Examiner—Tom Dunn
Assistant Examiner—Zidia Pittman
(74) Attorney, Agent, or Firm—Hunton & Williams

(57) ABSTRACT

Apparatus and process for safely welding a stud into an overhead workpiece that includes a ferrule having an interrupted perimeter surrounding the stud for contact with the overhead workpiece and a support assembly for connection to a stud gun including a shield surrounding the support assembly and having a continuous perimeter defining a free space by being spaced from the stud and wherein the free space is in communication with the interrupted perimeter of the ferrule. The free space has a width and depth sufficient to receive and contain all molten substances produced during the welding. A fire resistant material is positioned within the free space to hold all these molten substances to thereby safely protect the operator of the stud gun from the gravity induced falling molten substances.

20 Claims, 2 Drawing Sheets

METHOD AND APPARATUS FOR LEVELING AND SHIELDING A STUD GUN AND OPERATOR

FIELD OF THE INVENTION

This invention relates generally to the use of stud guns for welding a stud into a metal surface. More particularly the present invention relates to a method and apparatus for assisting the operator in leveling a stud gun particularly when installing a stud in an overhead workpiece. This invention further relates to a method and apparatus for permitting the operator to safely weld large diameter studs into an overhead workpiece without fear of molten substances produced during the welding falling by gravity onto and harming the operator.

BACKGROUND OF THE INVENTION

Arc stud welding is a process well known in the art and generally includes the two steps of developing the heat necessary for welding with an arc between the stud and the workpiece and then bringing the stud and the workpiece into intimate contact when the proper temperature is reached.

To achieve the welding of a stud, the apparatus necessarily includes a stud gun, a timing device for controlling the arc, a stud, a ferrule and a source of dc welding current. The stud is positioned into the chuck of the conventional stud gun, the ferrule is positioned around the end of the stud for engagement with the surface of the workpiece. When the trigger of the stud gun is depressed, an automatic welding cycle begins.

The body of the stud gun includes a solenoid coil that is energized to create an arc that raises the stud off the workpiece. This arc between the end of the stud and the workpiece melts both the stud and the workpiece at that precise location. The arc exists for a preset time period and when that time period passes the welding current is shut down and the spring of the stud gun plunges the stud into the molten pool between the stud and the workpiece to complete the weld. The gun is then removed from the stud.

The time for the stud welding process to be completed after initial contact between the stud and the workpiece ranges from a fraction of a second for smaller diameter studs and up to a second or more for larger studs of at least 19 mm in diameter. The diameter of the stud, however, can and usually does range for steel studs from about 3 to 32 mm, about an inch and a quarter. For these larger diameter studs, of course, the time required for the maintenance of the arc increases in accordance with the size of the stud.

Most arc stud welding processes require a ferrule that is placed around the stud at the weld end and is held in position by a ferrule holder then in turn is held by a conventional footplate. The ferrule is important in the welding operation because it concentrates the heat of the arc in the weld area while restricting the flow of air into the weld area to control oxidation of the molten metal produced and also attempts to confine the molten metal to the weld area.

The ferrule is composed of a ceramic material and is cylindrical in shape, flat across the bottom and serrated with a saw-tooth design at the working end for contact with the surface of the workpiece. The serrated end vents the gases that are expelled from the weld area. But particularly, for large diameter studs where it is necessary to have a longer timed arc producing a greater volume of molten metal, not only the gases escape through the saw-tooth end of the ferrule but also globs of molten metal are shot out with the gases.

Even though the ferrule is designed to keep most of the molten metal within the weld area, any molten metal that escapes with the high velocity gases creates a serious danger for the holder of the gun. Of course, the holder of the gun would not be in a dangerous position if the workpiece is below the level of the stud gun.

Many studs, however, are designed to be welded into an overhead workpiece and it is in that position where the molten metal escapes through the serrated ferrule and falls by gravity that the holder of the stud gun is in danger of being injured or at least his clothing set afire.

Accordingly, the safety of the holder of the stud gun is of paramount importance but is not the only problem facing the holder of the stud gun attempting to install a stud in an overhead workpiece. Particularly for the larger studs up through 32 mm, for instance, a larger, heavy duty gun is required to be supported by the operator. For shooting a large diameter stud in an overhead workpiece, it is particularly difficult to align the ferrule and stud perpendicularly to the workpiece. When the operator of the heavy duty stud gun does not place the centerline of the stud and therefore of the ferrule both orthogonally to the workpiece, not only would more molten metal fall onto the operator but the stud would not be positioned perpendicularly as it should be.

The closest prior art known to Applicant is Shoup, U.S. Pat. No. 4,531,042. Unfortunately for the operator, neither of the problems described above is solved by the method and apparatus disclosed in the Shoup patent.

After perusing the Shoup patent, it is clear that the disclosure relates to the installation of large diameter studs using a typical stud gun that includes a surrounding mechanism referred to as an arc blow coil. While it is disclosed that the coil assembly is used to support and align the stud gun when held against the workpiece, it is stated clearly that the apparatus and method is not for the installation of a stud in an overhead because of the added weight of the patented apparatus that is provided for the express purpose of not requiring as much downward pressure by the operator upon a workpiece that is below rather than above the stud gun. The fact that this patented apparatus and method is used only for a lower work surface, it is not possible for an operator to experience the gravity fall of molten metal substances from an overhead workpiece. Any radially outwardly extended surface from the notches or vents disclosed in Shoup that are located radially around the lower end of the ferrule would not and could not prevent flash or molten metal substances from coming down on the operator should the heavy stud gun be used contrary to the specific instructions in the patent and raised upwardly to weld a stud in an overhead workpiece.

Accordingly, it is the object and purpose of the present invention to solve the foregoing problems experienced in the prior art and particularly to present an apparatus and method for the welding of a stud, particularly a larger diameter stud, in an overhead workpiece without the danger of molten metal substances falling by gravity onto the operator and at the same time allowing the operator to easily align the heavy stud gun orthogonally to the overhead workpiece.

SUMMARY OF THE INVENTION

Apparatus for safely welding a stud into an overhead workpiece that includes a ferrule having an interrupted perimeter surrounding the stud for contact with the overhead workpiece and a support assembly for connection to a stud gun including a shield surrounding the support assembly and having a continuous perimeter defining a free space by being spaced from the stud and wherein the free space is in communication with the interrupted perimeter of the ferrule. The free space has a width and depth sufficient to receive and contain all molten substances produced during the welding. A fire resistant material is positioned within the free space to hold all these molten substances to thereby safely protect the operator of the stud gun from the gravity induced falling molten substances.

The method for safely welding a stud into an overhead workpiece with a stud gun that includes providing a ferrule with an interrupted ferrule perimeter, positioning the stud within the ferrule and surrounding the stud and ferrule with a shield having a shield perimeter. The shield perimeter forms a free space between the ferrule perimeter and the shield perimeter in which the free space is defined by a width dimension measured transverse to the axis of the stud of at least one half of the diameter of the stud and a depth dimension measured below the shield perimeter of between one quarter and five times the diameter of the stud.

DETAILED DESCRIPTION OF THE PREFERRED EMBODIMENT

The apparatus including the present invention is shown generally at 10 and includes a stud gun 12 that would be a heavy duty stud gun should the studs to be installed be greater than a half inch diameter. The stud gun 12 is of conventional design and includes along with the handle 14, a chuck 16 for holding the stud S that may be of a size from a quarter inch to an inch and a half or more in diameter. The length of the stud S varies in accordance with its desired uses.

Figure 1:
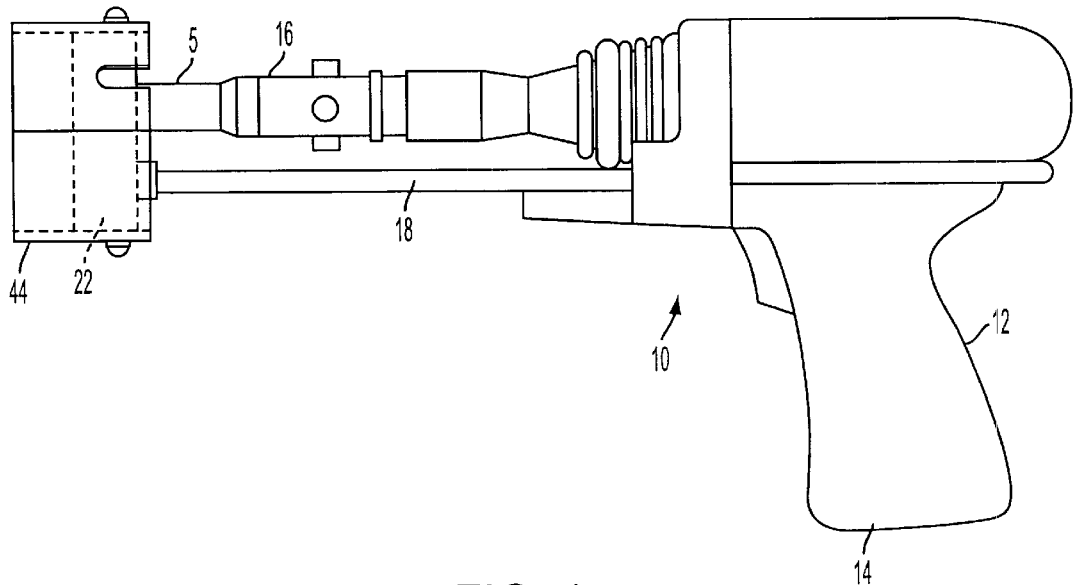
FIG. 1 is a side elevational view of the stud gun attached to the footplate surrounding which is the shield for containing the molten substances and also providing a means for leveling or aligning the stud.
Figure 2:
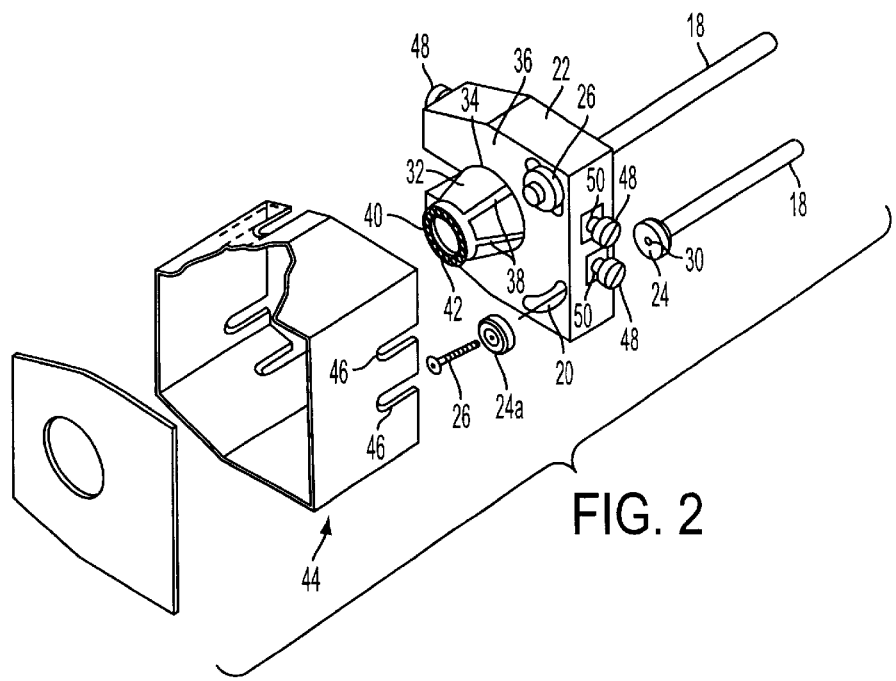
FIG. 2 is an exploded perspective view, partly broken away, illustrating the footplate, the ferrule holder, the ferrule for containing the stud and the shield with the perimeter shield partly broken away to illustrate the interior of the shield and the fire resistant material positioned within the free space surrounded by the shield perimeter.
Figure 4:
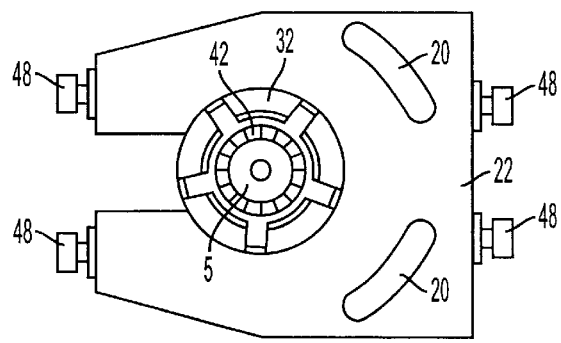
FIG. 4 is a plan view of the footplate, the retaining screws for securing the shield to the footplate, the ferrule holder bottomed on the footplate surrounding the ferrule having an interrupted saw-tooth perimeter surrounding the stud to be welded.

Secured to the gun are conventional foot rods 18 usually provided in a pair as best shown in FIG. 2. The foot rods 18 pass through suitable slots 20,20, as shown in FIGS. 2 and 4. The slots 20,20 are curved to provide for proper alignment of the footplate 22. Each of the foot rods 18 passes through one of the slots 20 and is held securely in the footplate 22 by support washers 24 and 24a on the lower and top side respectively of the footplate 22 and screw 26 is threaded into opening 30 of each of the foot rods 18.

The footplate 22 constitutes a support assembly along with a ferrule holder 32, best shown in FIGS. 2 and 4. The ferrule holder 32 is in the shape of a frustrum of a cone which has its base supported on the surface 36 of the footplate 22. The ferrule holder 32 also includes in its conical lateral sides, a plurality of lateral side slots 38 extending almost the complete length of the lateral side.

The purpose of the ferrule holder 32 is obviously to hold and support the ferrule 40 to enable it to concentrate the heat of the arc in the weld area and to restrict the flow of air to the weld area thereby helping to control oxidation of the molten weld metal and to confine the molten metal to the weld area. The ferrule is of conventional design and is made of a ceramic material usually accepted to have its broadest applications. The ferrule is held tightly within the ferrule holder and is easily removed after welding operation by breaking the ferrule because they are designed for a single use.

Figure 5:
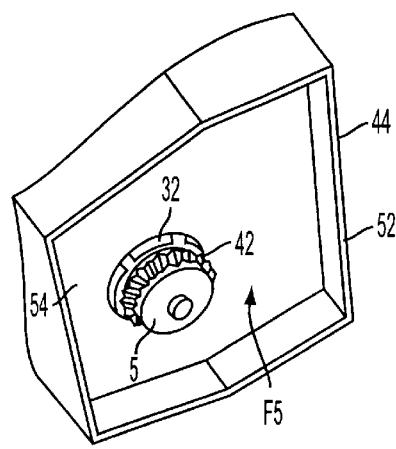
FIG. 5 is a perspective view, partly broken away, illustrating the continuous perimeter of the shield and the ferrule, the ferrule holder and the stud surrounded by the free space within the perimeter of the shield between the ferrule and the shield perimeter into which is positioned the fire resistant material.

At the perimeter 42 of the ferrule, as best shown in FIGS. 2, 4 and 5, it may be seen that it is discontinuous due to the saw-tooth arrangement producing a plurality of peaks and valleys for the purpose of exhausting gases during a welding operation. Unfortunately, these gases escaping also allow molten substances to fly out from the perimeter of the ferrule even though the majority of the molten substances is retained within the perimeter of the ferrule. It is for the purpose of protecting the operator of the stud gun 12 when welding a stud S into an overhead workpiece WP as shown in FIG. 3 that the purpose of the present invention comes clearly into view.

Figure 3:
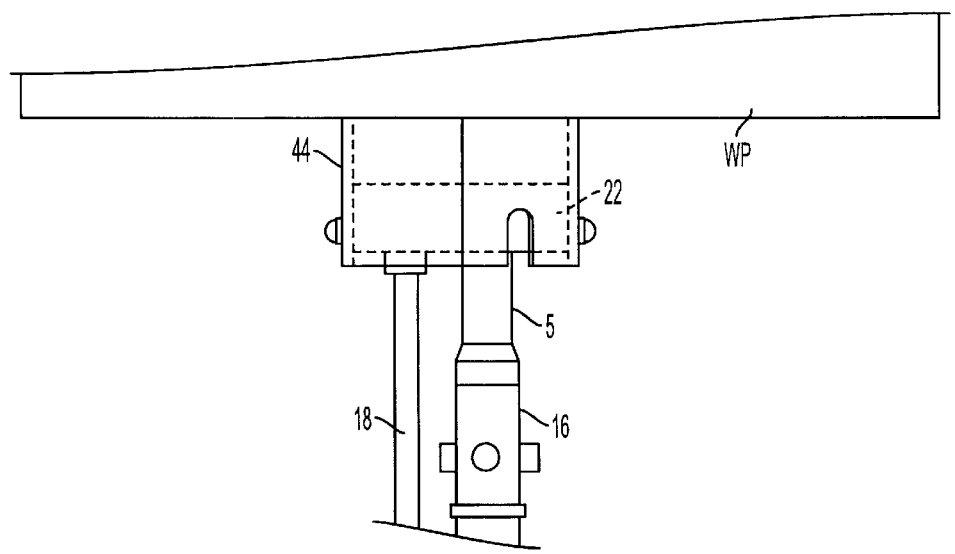
FIG. 3 is a side elevational view, partly broken away, of the chuck portion of the stud gun, the foot rods, the footplate partially in phantom, and the shield having the perimeter aligned with the surface of the overhead workpiece.

As shown best in FIGS. 2, 3 and 5, a rectangular metal shield having the general outline of the footplate 22 is installed over the footplate 22. The shield is secured to the footplate 22 by being received into dual pairs of slots 46 on each side of the shield 44 corresponding to and accommodating pairs of securing screws 48, which are received into suitable threaded bores 50 in the sides of the footplate 22. Upon being tightened, the securing screws 48 hold the shield 44 firmly in place on the footplate 22 of the support assembly.

It must be noted that while the perimeter of the ferrule is interrupted and not continuous by reason of the saw-tooth arrangement on the ferrule perimeter, the perimeter 52 of the shield 44 is continuous and preferably lies in a plane perpendicular to the longitudinal axis of the stud S. Other angular arrangements of the shield perimeter are possible for exotic welding processes but for most all conventional welding processes there is an orthogonal relationship between the longitudinal axis of the stud and the shield perimeter.

As shown, the shield perimeter 52 is remote from the ferrule perimeter 42 forming a free space FS, best shown in FIG. 5, that is an important aspect of the present invention because it is this free space that will receive and contain the splattering or molten substances produced during the welding process.

The free space FS may be defined by a width and depth that is sufficient to receive and contain all the molten substances and more specifically is defined by the extent of the shield perimeter being spaced from the stud by a width dimension measured transverse to the longitudinal axis of the stud of at least one-half the diameter of the stud at the minimum and maximum may be five up to ten or more times the diameter of the stud. The depth of the free space S, as measured below the shield perimeter 44 down to the surface 36 of the footplate 22, should be at least a quarter to three to five or more times the diameter of the stud.

It is a preferable aspect of the present invention to position a fire resistant material 54 in the free space FS so as to fill completely the free space FS to contact the shield 44 and the ferrule holder 32. This fire resistant material may be any suitable material such as a cloth, a woven material, a mat, a sheet or the like that does not burn or melt upon contact with molten substances. The fire resistant material may be made of a suitable high temperature resistant carbon or metal fiber or sheet, for instance.

The operation of the apparatus and the method for utilizing the invention should be apparent from the above and would be particularly and strikingly evident to the operator of the stud gun 12.

Assuming that a large diameter stud of at least one inch in diameter is to be installed in the overhead workpiece WP, only a heavier more powerful stud gun 12 would be used and the operator no matter how experienced would find that shooting studs into an overhead would be difficult particularly when the operator may be working off of staging or a ladder to reach the overhead workpiece WP. To hold the heavy stud gun perpendicular to the surface of the workpiece WP would be difficult except for the shield perimeter 52 of this invention that is designed to be positioned flush against the surface of the workpiece WP. When so positioned, as can be easily determined by the operator, it is then obvious to the operator that the proper perpendicularity between the longitudinal axis of the stud and the surface of the workpiece WP have been achieved. Then pressing the operating mechanism on the stud gun, the arc is created between the stud and the surface of the workpiece WP. While the ferrule perimeter 42 is also grounded onto the surface of the workpiece, the gases and significant molten substances created by the welding of a large diameter stud necessarily in part pass through the saw-tooth perimeter 42 of the ferrule but then enter the free space FS and are contained onto the fire resistant material 54 and completely retained within the perimeter of the shield preserving and protecting the operator from serious burn injuries.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:

1. In an apparatus for safely welding a stud into an overhead workpiece including a ferrule having an interrupted perimeter surrounding said stud for contact with said overhead workpiece and a support assembly for said ferrule and for connection to a stud gun, the improvement comprising:

a shield surrounding said support assembly and having a perimeter on said shield for engaging said workpiece, said shield perimeter defining a free space surrounding said ferrule, said free space being in communication with said interrupted perimeter of said ferrule, said free space having a width and depth sufficient to receive and contain all molten substances produced during said welding whereby to safely protect the user of said apparatus from gravity induced falling molten substances.

2. The apparatus of claim 1 including, said support assembly including a foot plate substantially coextensive with said shield perimeter for connection with said stud gun.

3. The apparatus of claim 2 including, said support assembly supporting said ferrule and extending below the interrupted perimeter of said ferrule.

4. The apparatus of claim 1 including, said shield perimeter being continuous and defining said free space by being spaced from said stud by a width dimension as measured transverse to the axis of said stud of at least ½ of the diameter of said stud.

5. The apparatus of claim 1 including, said shield perimeter defining said free space having a depth dimension between said shield perimeter and a planar portion of said support assembly of between ¼ to 5 times the diameter of said stud.

6. The apparatus of claim 1 including, a fire resistant material positioned within said free space and surrounding said stud for receiving and containing said molten substances.

7. The apparatus of claim 1 including, said support assembly including a foot plate substantially coextensive with said shield perimeter for connection with said stud gun, said support assembly supporting said ferrule and extending below the interrupted perimeter of said ferrule.

8. The apparatus of claim 1 including, said support assembly including a foot plate substantially coextensive with said shield perimeter for connection with said stud gun, said support assembly supporting said ferrule and extending below the interrupted perimeter of said ferrule, said shield perimeter defining said free space by being spaced from said stud by a width dimension as measured transverse to the axis of said stud of at least ½ of the diameter of said stud.

9. The apparatus of claim 1 including, said shield perimeter defining said free space by being spaced from said stud by a width dimension as measured transverse to the axis of said stud of at least ½ of the diameter of said stud, said shield perimeter defining said free space having a depth dimension between said shield perimeter and a planar portion of said support assembly of between ¼ to 5 times the diameter of said stud.

10. The apparatus of claim 1 including, said shield perimeter defining said free space by being spaced from said stud by a width dimension as measured transverse to the axis of said stud of at least ½ of the diameter of said stud, said shield perimeter defining said free space having a depth dimension between said shield perimeter and a planar portion of said support assembly of between ¼ to 5 times the diameter of said stud, a fire resistant material positioned within said free space and surrounding said stud for receiving and containing said molten substances.

11. The apparatus of claim 1 including, said support assembly including a foot plate substantially coextensive with said shield perimeter for connection with said stud gun, said support assembly supporting said ferrule and extending below the interrupted perimeter of said ferrule, said shield perimeter defining said free space by being spaced from said stud by a width dimension as measured transverse to the axis of said stud of at least ½ of the diameter of said stud, said shield perimeter defining said free space having a depth dimension between said shield perimeter and a planar portion of said support assembly of between ¼ to 5 times the diameter of said stud, a fire resistant material positioned within said free space and surrounding said stud for receiving and containing said molten substances.

12. An apparatus for connecting to a stud gun to safely weld a stud into an overhead workpiece including:

a ferrule having an interrupted perimeter surrounding said stud for contact with said overhead workpiece, a support assembly for said ferrule and for connection to a stud gun, a shield surrounding said support assembly and having a continuous perimeter on said shield remote from said stud for engaging said workpiece, said shield perimeter defining a free space surrounding said ferrule, said free space being in communication with said interrupted perimeter of said ferrule, said free space having a width and depth sufficient to receive and contain all molten substances produced during said welding whereby to safely protect the user of said apparatus from gravity induced falling molten substances.

13. A method for safely welding a stud into an overhead workpiece with a stud gun comprising:

providing a ferrule having an interrupted ferrule perimeter, positioning said stud within said ferrule, surrounding said stud and said ferrule with a shield having a shield perimeter, forming a free space between said ferrule perimeter and said shield perimeter, contacting said shield perimeter with said overhead workpiece, welding said stud into said overhead workpiece, receiving and containing all molten substances produced during said welding within said free space to safely protect a user of said stud gun from gravity induced falling molten substances.

14. The method of claim 13 including, providing a fire retardant material within said free space and surrounding said stud for receiving and containing said molten substances.

15. The method of claim 13 including, said free space being defined by said shield perimeter by being spaced from said stud by a width dimension as measured transverse to the axis of said stud of at least ½ the diameter of the stud.

16. The method of claim 13 including, said free space having a depth as measured axially along said stud of between ¼ and 5 times the diameter of said stud.

17. The method of claim 13 including, providing a fire retardant material within said free space and surrounding said stud for receiving and containing said molten substances, said free space being defined by said shield perimeter by being spaced from said stud by a width dimension as measured transverse to the axis of said stud of at least ½ the diameter of the stud.

18. The method of claim 13 including, providing a fire retardant material within said free space and surrounding said stud for receiving and containing said molten substances, said free space having a depth as measured axially along said stud of between ¼ and 5 times the diameter of said stud.

19. The method of claim 13 including, said free space being defined by said shield perimeter by being spaced from said stud by a width dimension as measured transverse to the axis of said stud of at least ½ the diameter of the stud, said free space having a depth as measured axially along said stud of between ¼ and 5 times the diameter of said stud.

20. The method of claim 13 including, providing a fire retardant material within said free space and surrounding said stud for receiving and containing said molten substances, said free space being defined by said shield perimeter by being spaced from said stud by a width dimension as measured transverse to the axis of said stud of at least ½ the diameter of the stud, said free space having a depth as measured axially along said stud of between ¼ and 5 times the diameter of said stud.

\* \* \* \* \*